UNITED STATES PATENT OFFICE.

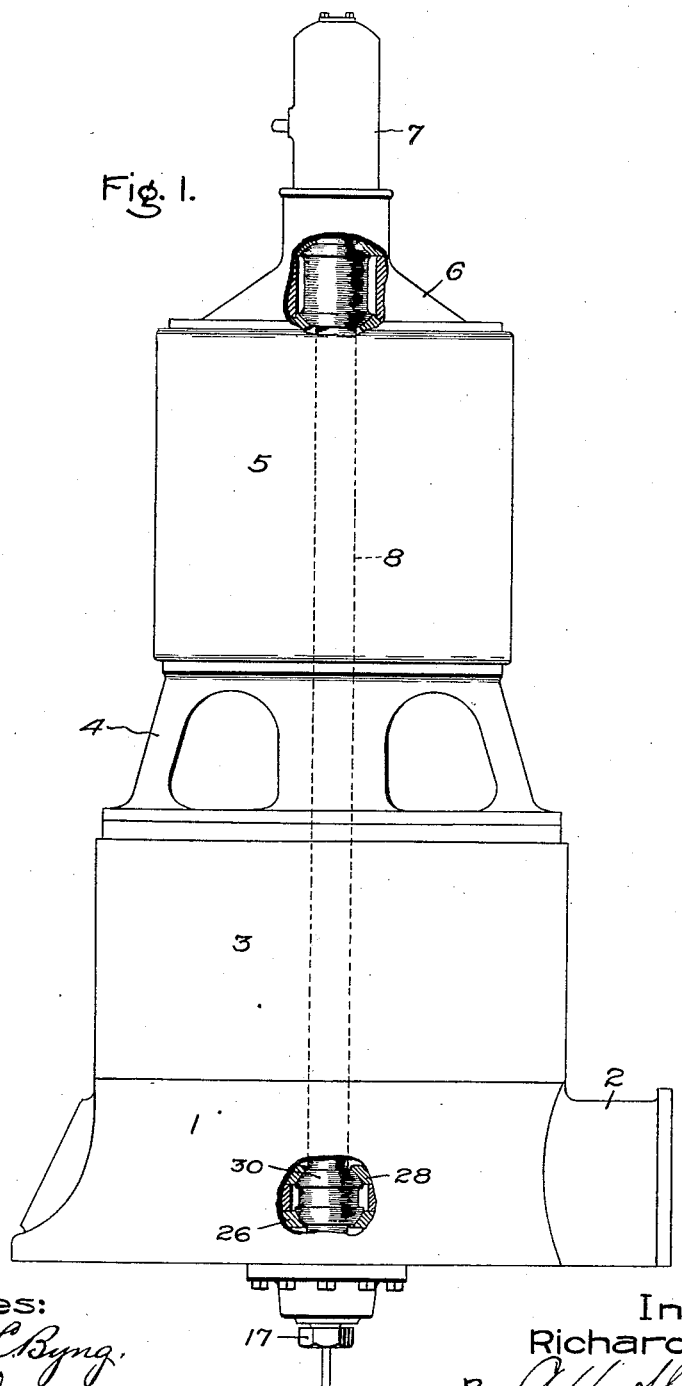

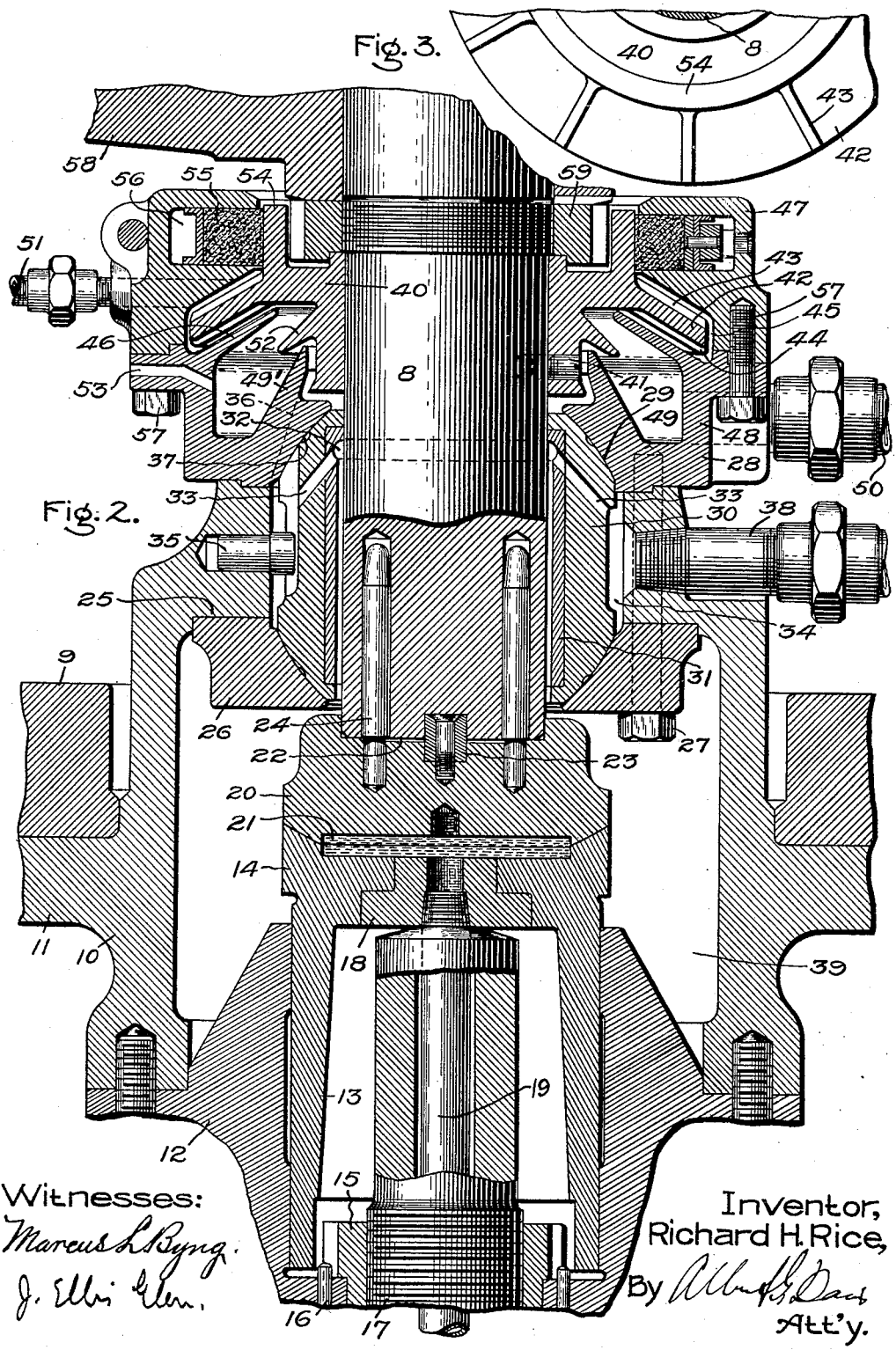

RICHARD H. RICE, OF LYNN, MASSACHUSETTS, ASSIGNOR TO GENERAL ELECTRIC COMPANY, A CORPORATION OF NEW YORK.

COMBINED STEP AND GUIDE BEARING FOR TURBINES.

1,041,512.  Specification of Letters Patent.  Patented Oct. 15, 1912.

Application filed March 6, 1907. Serial No. 360,955.

*To all whom it may concern:*

Be it known that I, RICHARD H. RICE, a citizen of the United States, residing at Lynn, county of Essex, State of Massachusetts, have invented certain new and useful Improvements in Combined Step and Guide Bearings for Turbines, of which the following is a specification.

My invention has for its object to provide a combined step- and guide-bearing of improved construction and is intended more especially for elastic fluid turbines.

In carrying out my invention the lower block of the step-bearing for the upright shaft is supported by the bottom wall of the turbine base, which base contains a chamber that receives the exhaust steam from the wheel buckets. In order to avoid the possibility of a change in position of the bottom wall of the base due to any cause such, for example, as that due to change in pressure or temperature affecting the alinement of said bearing with respect to an upper bearing, the opposed surfaces of the step-bearing are made spherical, and lubricant under pressure is continuously supplied to the center thereof in sufficient amount and under such pressure as will maintain a film between the blocks at all times. The lower end of the upright shaft is also provided with a guide-bearing carried by the base wall and having a spherical seat for the reason above set forth, and this seat and the spherical surfaces of the step-bearing blocks are struck from the same center; from this it follows that both the step- and guide-bearings are self-alining. The lubricant after passing between the step-bearing blocks flows through the guide-bearing after which it is returned to the supply. Preferably, but not necessarily, the upper guide-bearing above the turbine is also provided with a spherical seat. By reason of the construction described the operation of the turbine will not be affected, even though the shaft be slightly sprung.

In order to prevent the condenser connected to the chamber in the base of the machine from sucking lubricant from the guide-bearing, a packing is provided comprising an impeller rotating in a body of liquid such as water in the chamber inclosing it and by the pressure created forming a liquid seal. The impeller is not in contact with the walls of the chamber, hence changes in position of the parts will not affect it and no adjustment is required, a very desirable construction where the parts are relatively inaccessible. As a further precaution to prevent the escape of lubricant when the condenser is in operation and the impeller is not rotating a stationary packing is provided such, for example, as a carbon ring that engages a rotating part of the turbine and is carried by a suitable casing.

In the accompanying drawings, which illustrate one of the embodiments of my invention, Figure 1 is a view in elevation of a vertical-shaft turbine of the Curtis type; Fig. 2 is an enlarged axial section of the lower guide- and step bearing; and Fig. 3 is a partial plan view of the rotary element for creating a fluid pressure to prevent the admission of air to the vacuum chamber of the turbine when the machine is operating condensing and the escape of water.

1 indicates the base of the machine containing the chamber that receives the exhaust from the last bucket wheel, which chamber is connected to a condenser by the conduit 2. Mounted on top of the base is a casing 3 containing the usual nozzles, wheel and intermediate buckets, and partitions for dividing the casing into wheel compartments or stages. Mounted on top of the casing is a stool 4 that supports the stationary member of the generator 5. Mounted on top of the generator is a cover 6 that supports a dome 7, the latter inclosing the upper end of the shaft and the speed governor. The revolving element of the turbine and also of the generator is carried by a shaft 8 shown in dotted lines. The weight of the shaft and attached parts is carried by a step-bearing as will appear hereinafter. The shaft is guided by self-alining bearings at the ends.

Referring to Fig. 2, 9 represents the base of the machine or other support which is provided with a central opening to receive the casing 10 of the step- and the lower guide-bearings. This casing is provided with a flange 11 that is bolted to the under side of the base. The lower end of the casing is provided with a head 12, and between the casing and the head is an annular shoulder to center the head. The head is bored out centrally to receive the cylindrical guide 13 that is formed on or attached to the lower block 14 of the step-bearing.

Mounted in the head is a nut 15 which is prevented from turning by the upright pins 16 or equivalent means. Passing through this nut is a screw-threaded adjusting bolt 17 having an exposed head or other means whereby it can be adjusted in a vertical direction. The adjusting bolt extends upwardly through the cylindrical portion of the lower block and engages a seat 18 mounted thereon. The adjusting bolt is bored centrally to receive the conduit 19 for continuously conveying lubricant under suitable pressure to the parts. The upper end of the conduit is threaded to the seat 18 of the lower block. The upper surface of the lower block forms a portion of a sphere and contains a chamber that receives lubricant under high pressure. The upper bearing block 20 has a lower spherical surface struck from the same radius as the bearing surface of the lower block. In the under surface of the block is a chamber that registers with that in the lower block, and the chamber 21 thus formed is filled with lubricant under high pressure, which lubricant flows outwardly in a thin film between the opposing surfaces of the blocks. The lower end of the shaft 8 is seated in a socket formed in the upper block. The end of the shaft is chamfered slightly so as to insure a good fit between the shaft and the block. Since there is liability of the end of the shaft being slightly curved due to the action of the cutting-off tool when the shaft is made, the block is relieved at 22 so that the shaft rests only on the block near its periphery. The shaft and upper block are united by the key 23, the latter being secured to the block and extending across the end of the shaft from side to side. In addition to this, pins 24 are provided that serve to prevent relative angular movement of the shaft and block and also serve as a means for guiding the shaft into place in the socket. The casing 10 is provided with an internal shoulder 25 that supports the head 26 which forms a part of the seat for the guide-bearing. Between the head and its support is a shoulder which serves to center the latter. The head is secured in place by a number of bolts 27 that also secure the upper head in place. The bearing seat on the lower head 26 is made spherical and said surface is struck from the same center as the surfaces of the step-bearing. Mounted on top of the casing is a head 28, which head is centered by means of a shoulder formed on the under surface and engaging with an annular shoulder on the casing. This head forms a part of the guide-bearing seat and is provided with a spherical surface 29 that is struck from the same center as the seat on the lower head and also the opposed surfaces of the step-bearing blocks. Located between the heads 26 and 28 and engaging the spherical seats is a sleeve 30 having spherical ends. This sleeve is provided with a lining 31 made of babbitt or other suitable material. The babbitt is cut away at the upper end to form an annular channel 32 to collect lubricant as it flows outwardly. The channel is provided with passages 33 that discharge the lubricant into an annular chamber 34 surrounding the sleeve 30. The said sleeve is prevented from rotating by the pin 35 which is carried by the bearing casing. This pin fits losely into a longitudinal slot formed in the member 30, which slot is open at the upper end so that the sleeve can be inserted in place from below. The lining 31 is provided with vertically extending grooves which receive lubricant at the lower end and discharge into the channel 32 at the upper end. As many of these channels may be provided as are necessary; I have found in actual practice that eight are sufficient.

It sometimes happens that lubricant will be forced past the channel 32 into the space directly above the guide-bearing, and in order to prevent it from being carried up beyond this space into the chamber receiving the exhaust from the liquid seal, passages 36 are provided, as shown in dotted lines in the head 28. Under normal conditions the sleeve 30 is stationary and hence lubrication is unnecessary; but in order that it may be free to adjust itself to compensate for any lack of alinement due to distortion or otherwise, annular oil groves 37 are provided at the top and bottom. The lubricant collected in the annular chamber 34 is fed by the pipe 38 back to the suction side of the pump.

The pressure of the lubricant admitted by the pipe 19 to the chamber 21 is sufficient to slightly separate the blocks, and the pressure of this lubricant is gradually decreased until it reaches the chamber 39 surrounding the step-bearing blocks where its pressure is substantially that of the atmosphere. This chamber is always filled with lubricant when the machine is in operation and the escape therefrom is through the vertically disposed grooves in the babbitt lining, the annular channel 32, passages 33, chamber 34 and exhaust pipe 38.

Since most of these turbines are intended to operate condensing, it is necessary to provide means for preventing the lubricant from the step- and guide-bearings from flowing into the exhaust-receiving chamber in the base, the pressure of which is commonly about one pound absolute, and therefore tends at all times to draw lubricant from the bearings. This means includes an element 40 mounted on the shaft and held in place against a shoulder thereon by the radial screw 41. The said element is provided with a downwardly turned flange 42 having sets of vanes 43 and 44 mounted thereon. Under certain conditions it is possible to use only one set of vanes, but I prefer to use a double set as shown. These vanes rotate in a pressure chamber 45 that is formed between an inwardly extending shoulder or projection 46 on the head 28 and the inner inclined wall of the cap 47. Between the internal inclined projection 46 and the annular extension 48 on the head 28 rising above the bearing seat is formed an exhaust chamber 49 through which the water from the liquid seal flows by gravity to the pipe 50. In order to save space, decrease the number of parts and the machine work, the exhaust chamber, extension 48 and the wall or projection 46 are located in the head 28 forming the upper portion of the seat for the guide-bearing, but the parts and the chamber may be formed in a separate piece if desired. The pressure chamber is constantly supplied with water from a suitable source, such as the city service main, by a pipe 51, and a continuous flow is maintained subject to the control of a hand valve. As the element 40 is rotated the sets of vanes 43 and 44 act by centrifugal force to create a pressure in the chamber of sufficient amount to overcome the tendency of the vacuum to suck oil from the bearings. When the parts are in operation, the cross-section of the column of fluid in the chamber 45 is U-shaped and ordinarily the legs of the U are substantially of the same length, but as the absolute pressure due to the condenser changes, one leg will become longer or shorter than the other, depending upon said pressure.

In order to keep the water discharging from the pressure chamber 45 separate from the lubricant supplied to the bearings, a downwardly extending lip or flange 52 is provided that overhangs the annular projection or extension 49' on the upper head 28 of the guide bearing. In order to avoid any tendency for the water to back up in the chamber 49, an air vent 53 is provided, the inner end of which extends beyond the line of discharge of the lip 52 on the rotating member 40. The object of this latter feature is to prevent the water discharged from said lip from directly entering the air vent and thus escaping.

Since it sometimes happens that it is desirable to shut down a machine without shutting down the condenser, it follows that unless suitable means are provided to prevent it, air will leak into the condenser from the chamber 49 or through the joints of the various parts, because when the turbine is stationary the liquid seal is ineffective. The water is also liable to be sucked out of the pressure chamber. In order to guard against this, the element 40 is provided with an annular flange 54 located on its upper side, and surrounding and engaging this flange is a packing 55 of suitable construction. In the present case I have shown a packing made of carbon which is normally pressed by springs into engagement with said flange. The packing is mounted in a recess 56 formed in the cap although it may be in a separate piece if desired. The cap is secured to the upper head 28 of the guide-bearing by bolts 57. In order to permit of the carbon packing ring being inserted in its recess the cap is made in parts, the plane of division extending axially. Bolts or other means are employed to unite the parts of the cap. Mounted on the shaft above the carbon packing is a bucket wheel 58 located in the chamber in the base of the turbine which is held in place by a nut 59, the latter being screw-threaded to the shaft.

In event of the step- and guide-bearings being carried by a support in such manner that the vacuum exerts no effect on the lubricating system, I may omit the liquid seal and also the carbon packing ring.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a turbine, the combination of a vertical shaft, a casing, a guide bearing for the shaft having a spherical surface, a seat therefor comprising an upper member secured to the casing and a lower member detachably secured to the casing, which when detached and lowered permits the guide bearing to be lowered without disturbing the casing and the shaft, and a step-bearing, the lower block of which is carried and guided by the casing, the opposed surfaces of the bearing being spherical and having the same center as the spherical surface of the guide-bearing.

2. In a turbine, the combination of a vertical shaft, a casing having a central bore, a guide-bearing for the shaft having a spherical outer surface, a seat therefor comprising a member which forms the upper end of the casing and a second member that is smaller in diameter than said bore and is attached to the interior of the bore adjacent the upper end thereof, the end of the shaft projecting through the guide bearing and said second member into the bore, a step-bearing for the projecting end of the shaft arranged within the bore of the casing below said second member, the opposed surfaces of the step-bearing being spherical and having the same center as the spherical surface of the guide-bearing, and a detachable head secured to the casing at the lower end of the bore which supports the step-bearing.

3. In combination, a vertical shaft, a guide-bearing comprising a lining and a sleeve with a spherical surface, a seat therefor, a step-bearing comprising a rotatable and a stationary block having opposed spherical surfaces, a means for adjusting one of the blocks vertically, a guide for the means, and a casing for the bearings.

4. In combination, a vertical shaft, a guide-bearing therefor having a spherical surface, a step-bearing for the end of the shaft arranged below the guide-bearing and including blocks having opposed spherical surfaces, the said surfaces being struck from the same center, an internally shouldered casing for the bearings, an upper head mounted on the top of the casing, a lower head mounted inside the casing and attached to the under side of the shoulder, the said heads engaging the guide-bearing and forming a seat therefor, means by which the lower step-bearing block is mounted in the casing and guided for longitudinal movement therein, and a device for adjusting said block.

5. In combination, a vertical shaft, a sleeve surrounding the shaft and having a spherical surface, a lining for the sleeve, a spherical seat for the sleeve, a step-bearing comprising a stationary and a rotating block, the opposed surfaces of which are spherical, the said spherical surfaces of the seat and the blocks being struck from the same center, a guide and a support for the lower step-bearing block, a means for adjusting the position of the lower block in the support, and a means for supplying lubricant under pressure to the central portions of said spherical surfaces.

6. In combination, a vertical shaft, a guide-bearing having a spherical seat, a step-bearing including blocks having opposed spherical surfaces, one rotating on the other and secured to the shaft, the spherical surfaces of the seat and blocks being struck from the same center, a casing common to the bearings, a detachable head for the casing that supports and guides the vertical movements of the lower step-bearing block, and a pair of heads also attached to the casing that engage the guide-bearing above and below its central portion and form a seat therefor, the lower head being removable from the underside through the opening normally covered by said detachable head.

7. In a turbine, the combination of a base which is subject to changes due to pressure and temperature variations, in combination with a guide-bearing for the lower end of the shaft having a spherical seat, a step-bearing for supporting the weight of the shaft comprising a rotating and a stationary block, the opposed surfaces of which are spherical and struck from the same center as the seat of the guide-bearing, a casing containing said seat and supporting the lower step-bearing block, means for attaching the casing to the turbine base, and a screw for adjusting the position of the step-bearing.

8. In a turbine, the combination of a vertical shaft, a guide-bearing therefor through which the shaft is vertically adjustable, a spherical seat for the bearing, a step-bearing for the shaft comprising relatively rotating blocks, the opposed surfaces of which are spherical and struck from the same center as the said seat, a guide for the lower block, an adjusting means for raising and lowering the shaft and the step bearing in respect to the guide bearing, and a wall for supporting the adjusting means that is subject to distortion due to temperature changes.

9. In a turbine, the combination of its casing with a vertical shaft, a guide bearing therefor having a spherical seat, a step bearing carried by the casing and changing its position with casing distortions and comprising members, one of which is keyed to the shaft and the other is held against rotation in the housing, the opposed working surfaces of said members being spherical and struck from the same center as said seat, a housing for supporting the bearings and guiding the vertical movements of the lower member, and a packing which prevents air and also lubricant from the bearings from entering the turbine.

10. In a turbine, the combination of its casing with a vertical shaft, a guide-bearing therefor having a spherical seat formed of two detachable heads, a step bearing carried by the casing and changing its position with casing distortions and comprising members, the opposed surfaces of which are spherical and struck from the same center as said seat, a housing for the bearings which is rigid with the casing of the turbine and carries both of said heads, and a packing for preventing leakage between the turbine casing and the bearings which is supported by one of said heads.

In witness whereof, I have hereunto set my hand this fourth day of March, 1907.

RICHARD H. RICE.

Witnesses:
JOHN A. MCMANUS, Jr.,
PHILIP F. HARRINGTON.